Aug. 24, 1965 F. A. WISSEL 3,202,921

FREQUENCY SENSITIVE DEMODULATOR

Filed Feb. 20, 1962

INVENTOR.
FRANCIS A. WISSEL.
BY Alden D. Redfield
Irwin P. Garfinkle
ATTORNEYS.

3,202,921

FREQUENCY SENSITIVE DEMODULATOR

Francis A. Wissel, Cincinnati, Ohio, assignor to Avco Corporation, Cincinnati, Ohio, a corporation of Delaware Filed Feb. 20, 1962, Ser. No. 174,501
17 Claims. (Cl. 329—166)

This invention relates to signal-sensitive detectors or discriminators from which a negative output is derived from all but a narrow frequency range for providing improved signal selectivity and noise immunity in an amplitude-modulated receiver.

A major problem in telemetry involves the positive recognition of command signals, and for this purpose noise-immune circuitry is required. The present invention utilizes a signal-controlled demodulator or detector which functions as a filter for the purpose of gating out a broad spectrum of signal and noise so that only signals falling within a narrow pass band are recognized for useful purposes. The effect of the detector of this invention is to provide a unique filtering action to automatically quiet a receiver so as to reject Johnson noise and other undesired signals. The concept is generally applicable to amplitude-modulated radio receivers.

The primary object of this invention is to provide a signal-controlled demodulator in which only desired signals falling within a very narrow pass band are recognized and passed for a useful function.

Another object of this invention is to provide a ring-type demodulator in which the signal is gated by means of a phase-sensitive network to provide a very narrow pass band for the desired signal.

Briefly described, this invention incorporates a conventional diode ring demodulator comprising a diode bridge having rectifier elements sensed in the same direction going around the bridge. The bridge is provided with signal input terminals across one of the diagonals and reference input terminals across the other diagonal. Signal input voltage is derived from a signal input transformer and applied directly to the signal input terminals. The reference voltage input is derived from a reference transformer, which is energized by input signal, but which is provided with a phase shift with respect to the input signal. The input signal voltage is applied to the signal input terminal while the reference voltage is applied to the reference input terminals. The phase shift between the input signal voltage and the reference voltage is accomplished by a phase-sensitive double-tuned network resonant at the desired signal frequency. At the desired frequency the phase shift is zero, but increases to a maximum of 180 degrees as the frequency changes. The output from the ring detector is maximum at the desired frequency and reduces to zero as the phase shift increases to 90 degrees, and then goes negative beyond 90 degrees. As will be understood by persons skilled in the art, this arrangement provides a highly selective output.

Figure 1:
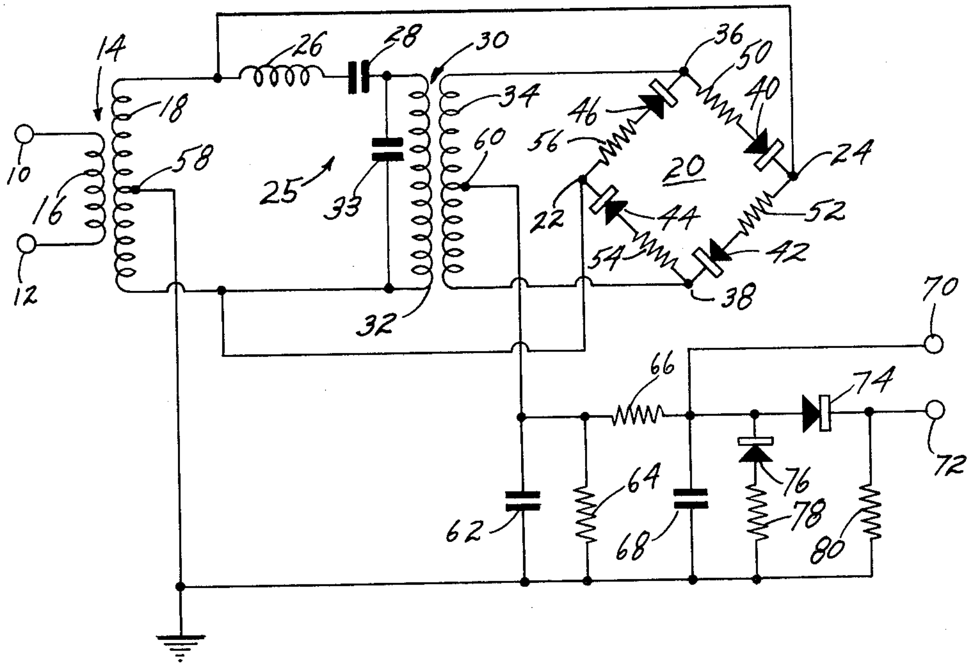

For a better understanding, and for other objects and advantages of this invention, reference should now be made to the following detailed specification and to the accompanying drawing in which:

FIG. 1 is a circuit diagram of a preferred form of this invention; and

Figure 2:
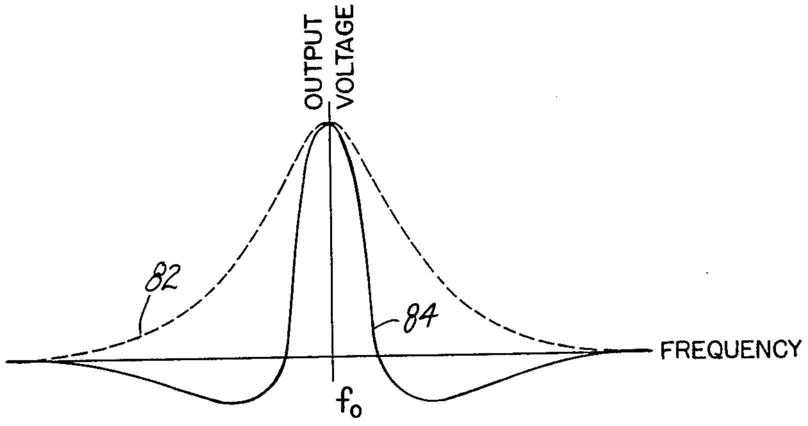

FIG. 2 comprises two curves comparing the performance of this invention with that of the prior art.

In its contemplated environment, the signal demodulator of this invention is intended for use in an amplitude-modulated command-type receiver. Received energy at the terminals 10 and 12 are applied to the signal input transformer 14, which comprises a primary winding 16 and a secondary winding 18. It will be understood that the received signal may comprise electro-magnetic radio energy amplitude-modulated with intelligence. The purpose of the system is to provide an intelligence output only when the signal energy is at a predetermined frequency. The voltage developed across the secondary winding 18 is impressed in two paths across a diode ring demodulator 20. The first path is directly across signal voltage input terminals 22 and 24 of demodulator 20. The second path is through a double-tuned network 25 including a series-resonant inductor 26 and capacitor 28, and transformer 30 having a primary winding 32 tuned by a parallel-connected capacitor 33, and a secondary winding 34 connected across reference voltage input terminals 36 and 38.

The ring demodulator 20 is a diode bridge including the diodes 40, 42, 44, 46, all connected in a series loop with the resistors 50, 52, 54, and 56. As shown, all of the diodes 40–46 are sensed in the same direction around the bridge. The signal output from the ring demodulator 20 is derived from between the center tap terminals 58 and 60 of the transformer secondaries 18 and 34, respectively. The signal output is then applied to a filter network including capacitor 62, resistor 64, resistor 66, and capacitor 68, for eliminating double frequency ripple, and a "normal" output from the demodulator may be derived from between the output terminal 70 and ground. An "alternate" output may be derived at output terminal 72 from a rectifier network including a diode 74, diode 76, and resistors 78 and 80.

The ring demodulator 20 is a product demodulator which provides a low frequency output proportional to $e_1 \cos \theta$, where $e_1$ is the input signal (or the smaller of the two applied voltages) and $\theta$ is the relative phase angle between the signal voltage and the reference voltage. In a conventional diode ring demodulator, a large reference voltage is applied to one pair of the ring terminals for switching one pair of the diodes on and off at the reference frequency rate. The signal voltage input is applied to the other terminals, and a voltage output is developed as a direct function of phase difference between the signal voltage and the reference voltage. Generally the reference voltage frequency is fixed, or in any event is independent of signal frequency. When the signal and reference voltages are in phase, a maximum output voltage of one polarity is developed; when 180 degrees out of phase, a maximum output voltage of an opposite polarity is developed; zero output is developed for a 90 degree phase difference.

In this invention, the signal voltage developed across the secondary winding 18 of transformer 14 is applied to the terminals 22 and 24 of the diode ring demodulator 20. The other pair of terminals 36 and 38 is supplied with the voltage developed across the secondary winding 34 of transformer 30. It will be understod that the phase of the voltage developed across the secondary winding 34 is dependent on the signal, and is related to signal as a function of frequency. That is to say, the double-tuned network, including the inductor 26 and capacitor 28 and the tuned transformer 30, introduces a change in phase angle $\theta$ between the signal voltage $e_1$ and the reference voltage in response to changes in signal frequency.

The parameters of the double-tuned network 25 are selected so that at a desired frequency $f_0$ the network provides a phase shift of zero degrees. With a zero degree phase shift, a maximum positive voltage output is developed. However, as the frequency applied to the double-tuned network shifts up or down from the desired frequency, a phase shift of up to 180 degrees is introduced. As the phase shift increases from zero to 90 degrees, the output from the ring demodulator 20 reduces from a positive maximum towards zero; and as the phase shift continues to 180 degrees, the output increases from zero to a negative maximum. At the desired frequency $f_0$, the voltage developed across the secondary winding 34 of transformer 30 is made greater than the voltage developed across the secondary winding 18 of transformer 14.

The curves in FIG. 2 demonstrate the marked improvement resulting from this invention as compared with the prior art detectors using conventional filters. The curve 82 represents the frequency response characteristic of a conventional tuned circuit, while the curve 84 represents the frequency response characteristic of the demodulator in accordance with this invention. It will be noted that as contrasted to the prior art, the output from the ring demodulator 20 actually goes negative with a phase shift beyond 90 degrees. The double-tuned network design which controls the output selectively characteristic is arranged to provide a relatively slow phase change in the desired signal range with a relatively rapid phase change as the signal frequency shifts to an undesired range, and it provides a 180 degree limit that prevents a direct polarity output from signals well removed from the desired frequency range. The selectivity characteristic curve 84 depends on the phase characteristics of the double-tuned network near the resonant frequency and on the ratio of the voltages applied to the terminals of the ring demodulator. The pass band selectivity of the double-tuned network may be designed to suit the particular application.

The double frequency output from between the terminals 58 and 60 is suppressed by the filter network including the capacitors 62 and 68 and resistors 64 and 66. The normal output is taken from the secondary winding at terminal 70, while an alternate output may be derived at the terminal 72 through the diode 74, which provides a simple polarity sensitive gate where a reverse-polarity output must be avoided.

For the purpose of better enabling persons skilled in the art to reproduce this invention, the following parameters, which represent an embodiment of this invention actually reduced to practice, are listed below:

| | |
|---|---|
| Inductor 26 | 60.7 mh. |
| Primary winding 32 | 59 mh. |
| Capacitor 28 | 456 $\mu$f. |
| Capacitor 33 | .00482 $\mu$f. |
| Capacitor 62 | .1 $\mu$f. |
| Capacitor 68 | .05 $\mu$f. |
| Diodes 40–46 | Type 1N647. |
| Diodes 74 and 76 | Type 618C. |
| Resistors 50–56 | 5.4K ohms. |
| Resistor 64 | 500K ohms. |
| Resistor 66 | 330K ohms. |
| Resistor 78 | 500K ohms. |
| Resistor 80 | 1 megohm. |

It is to be understood that these parameters are subject to fairly wide tolerance. The system was reduced to practice at an output frequency $f_0$ equal to 9.55 kilocycles. It will be recognized that in this frequency band, the usual filter parameters are cumbersome and difficult to implement. This invention has not only provided improved filtering, but has done so with comparative simplicity and with low-cost components. These features make it highly useful in command-receiver equipment where audio frequencies may serve for the transmission of intelligence.

The present system is especially useful as a demodulator of a selected pulse-amplitude-modulated channel in a frequency-division multiplex system. It offers particular advantages where direct-coupled circuitry is used between the demodulator and the useful output, and where absolute amplitude and polarity can be used to distinguish a desired signal from undesired signals and noise. The elimination of the undesired direct current output due to noise is then most important as well as the rapid drop in output voltage to zero and reverse polarity at undesired frequencies.

The particular application originally envisioned involved the detection of a binary (on-off) pulse modulated subcarrier in the presence of noise and other signals. The conventional envelope detector provided a direct current output due to noise alone, and thus set a high minimum threshold of detectability level which could not be reduced by post-detection filtering. The noise contribution to the threshold is reduced substantially by elimination of this direct current output, and the reduced effective noise bandwidth due to the steeper sides of the effective selectivity curve. This enables weaker desired signals to be detected and makes the design of the decision circuitry much less critical and more reliable.

The system also provides for a simple gate to eliminate a possible reverse-polarity output which can be caused by an undesired signal in the absence of the desired signal. Undesired signals in the frequency band, corresponding to below-the-axis portions of the curve of FIG. 2, will produce reverse-polarity outputs in the absence of the desired signal. The system may not be fully effective where anticipated undesired signals in this reverse-polarity region occur simultaneously with the desired signal with an amplitude more than several times the desired signal.

Thus it is seen that there has been provided a freqency and phase-sensitive network for driving a signal demodulator, and the demodulated output is proportional both to the input voltage and the cosine of the phase angle shift in the phase-sensitive network. While a two-stage or double-tuned filter has been illustrated, it will be understood that many modifications of the phase-shifting network may be envisioned by persons skilled in the art and that modifications to the various input and output circuits may also be made. For that reason, it is intended that this invention be limited only by the annexed claims as interpreted in the light of the prior art.

What is claimed is:

1. In a frequency selective system for detecting the output from a source of amplitude-modulated alternating current signals, the combination comprising:
   - a bridge-type demodulator including a plurality of diodes sensed in the same direction around the bridge, said bridge having two pairs of diagonally opposed junctions constituting first and second pairs of terminals;
   - a connection from said source across the first pair of terminals;
   - a frequency-sensitive phase-shifting network;
   - another connection from said source across the second pair of terminals through said phase-shifting network, said phase-shifting network having characteristics such that the phase angle between the voltages developed across said first and said second pairs of terminals is a minimum when the voltage of said source of frequencies is a predetermined frequency, and wherein the phase angle between said voltages increases up to 180 degrees when the output from said source is varied from said predetermined frequency, whereby the selectivity of said system is enhanced and D.C. components of broadband noise are substantially cancelled or reduced.

2. The invention as defined in claim 1 wherein said frequency-sensitive phase-shifting network is a double-tuned network.

3. The invention as defined in claim 2 wherein said double-tuned network comprises a series-resonant tank circuit connected in series with a parallel-resonant tank circuit.

4. The invention as defined in claim 1 wherein said plurality of diodes comprises first, second, third, and fourth rectifiers.

5. The invention as defined in claim 4 wherein said diodes are semiconductors.

6. In a frequency-sensitive demodulator system, the combination comprising:
- a center-tapped source of amplitude-modulated alternating current signals;
- automatic means for generating a voltage which is shifted in phase by an amount proportional to the difference in frequency of said source from a predetermined frequency, said means including a double-tuned transformer having a center-tapped secondary winding;
- a bridge-type demodulator including a plurality of diodes sensed in the same direction around the bridge, said bridge having two pairs of diagonally opposed junctions constituting first and second pairs of terminals;
- means connecting said source across the first pair of terminals of said bridge;
- means connecting said secondary winding across the second pair of terminals of said bridge;
- and means for deriving demodulated output signals from said bridge from between the center tap of said source and said secondary winding, respectively, whereby the selectivity of said system is enhanced and D.C. components of broadband noise are substantially cancelled or reduced.

7. The invention as defined in claim 6 wherein said automatic means for generating a voltage which is shifted in phase comprises a double-tuned network, the phase of which shifts with applied frequency up to a limit of 180 degrees, said network being energized by said amplitude-modulated alternating current signals.

8. The invention as defined in claim 7 wherein said double-tuned network comprises a series-resonant tank circuit connected in series with a parallel-resonant tank circuit.

9. The invention as defined in claim 6 wherein said plurality of diodes comprises first, second, third, and fourth rectifiers.

10. The invention as defined in claim 4 wherein said diodes are semiconductors.

11. The invention as defined in claim 7 wherein said network provides a zero degree phase shift when said source is at said predetermined frequency.

12. In a frequency-sensitive demodulator system, the combination comprising:
- a phase-sensitive demodulator;
- an input circuit for said demodulator and an output circuit for said demodulator, said demodulator having characteristics such that a maximum voltage is produced across said output circuit when first and second in-phase signals are applied across said input circuit;
- a source of amplitude-modulated alternating currents for generating said first signals;
- means connecting said source directly across said input circuit;
- a frequency-sensitive phase-shifting network having characteristics such that the phase shift of a signal applied thereto is zero degrees when the applied signal is at a pre-determined frequency, but automatically increases as the frequency of said applied signal is varied from said predetermined frequency;
- means also connecting said source to said frequency-sensitive phase-shifting network for generating said second signal; and
- means for applying said second signal across said input circuit of said phase-sensitive demodulator, whereby a maximum voltage is developed across said output circuit when the frequency of said source is at said predetermined frequency.

13. The invention as defined in claim 12 wherein said demodulator is a bridge-type demodulator including a plurality of diodes sensed in the same direction around the bridge, said bridge having two pairs of diagonally opposed junctions constituting first and second pairs of terminals, and wherein said source is directly connected across said first pair of terminals, and also across said second pair of terminals through said phase-shifting network.

14. The invention as defined in claim 13 wherein said frequency-sensitive phase-shifting network is a double-tuned network.

15. The invention as defined in claim 14 wherein said double-tuned network comprises a series-resonant tank circuit connected in series with a parallel-resonant tank circuit.

16. The invention as defined in claim 13 wherein said plurality of diodes comprises first, second, third, and fourth rectifiers.

17. The invention as defined in claim 16 wherein said diodes are semiconductors.

References Cited by the Examiner

UNITED STATES PATENTS

| | | | |
|---|---|---|---|
| 2,761,062 | 8/56 | Wirkler | 325—476 |
| 2,827,611 | 3/58 | Beck | 329—166 X |
| 3,023,357 | 2/62 | Hierholzer et al. | 307—88.5 |

ROY LAKE, *Primary Examiner.*